Dec. 1, 1931.  J. F. KRAYER  1,834,848
ANALYTICAL BALANCE
Filed Jan. 10, 1931  2 Sheets-Sheet 1

JOHN F. KRAYER
INVENTOR
BY Victor J. Evans
ATTORNEY

Dec. 1, 1931.  J. F. KRAYER  1,834,848
ANALYTICAL BALANCE
Filed Jan. 10, 1931  2 Sheets-Sheet 2
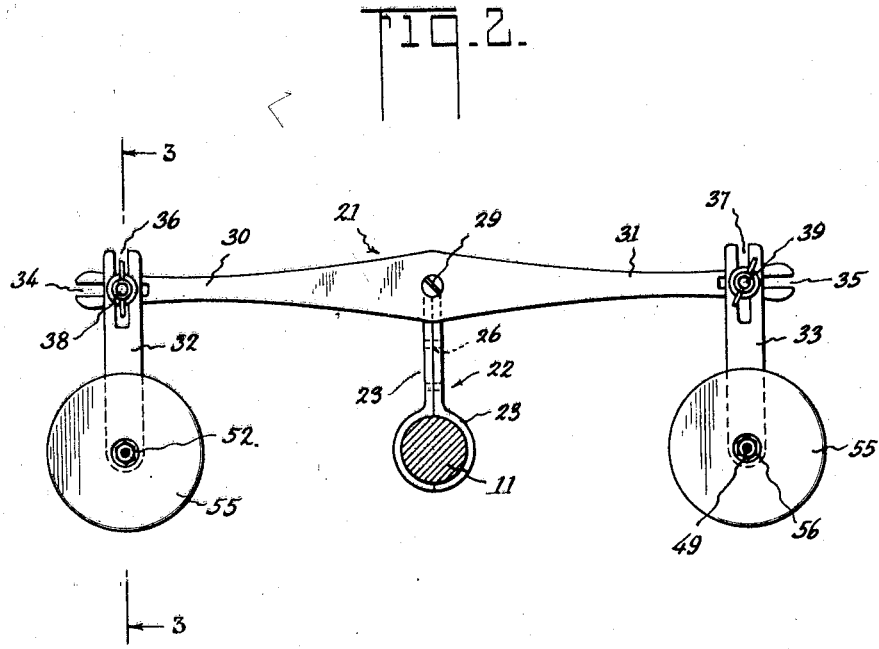
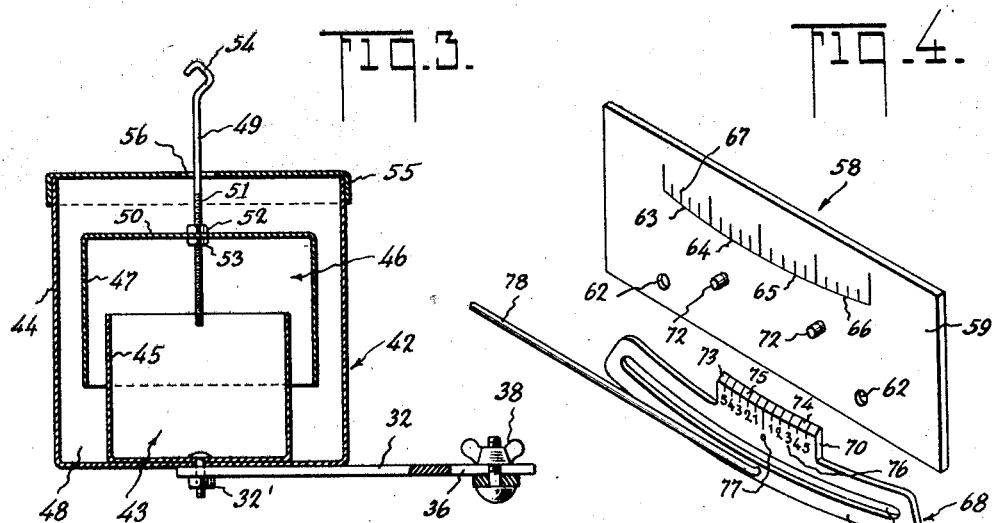
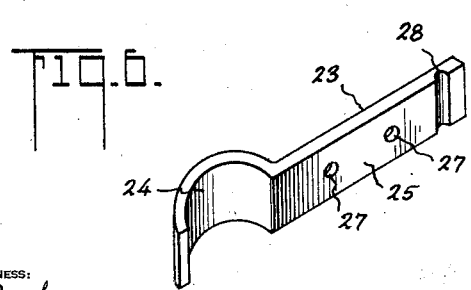
JOHN F. KRAYER
INVENTOR
BY Victor J. Evans
ATTORNEY Patented Dec. 1, 1931

1,834,848

UNITED STATES PATENT OFFICE

JOHN F. KRAYER, OF FLUSHING, NEW YORK

ANALYTICAL BALANCE

Application filed January 10, 1931. Serial No. 507,920.

This invention relates to precision weighing instruments, and more particularly to balances as used in analytical chemistry, assaying and the like.

Analytical and assay balances as at present used commonly include a swingable beam having a high degree of sensitivity, which is adapted to support, at each of its ends, a pan for the reception of the material to be weighed, and/or any necessary counter weights, the beam generally including a pointer, or indicator adapted to cooperate with a suitable graduated scale, the graduations on the scale being extremely fine, for measurement of extremely light weights. In the use of such balances, it has been found that the beam and the indicator have been subject to oscillation from one direction to another, when the balance is in use, the frequency of the oscillations being such that a considerable length of time has elapsed before the pointer or indicator has come to its point of rest on the scale.

The primary object of the present invention is to enable an analytical or assay balance and the like to come to rest without appreciable oscillation of the beam and pointer, the oscillations being effectively damped, so that the balance will be quick acting, thereby resulting in an appreciable saving of time, and greater accuracy in the use of the balance.

Another object of the invention is to provide an analytical or assay balance with shock absorbing means in the form of air cushion devices which include a movable cup or the like carried at each end of the beam, each of these cups cooperating with a pair of stationary concentric cups being adapted to form an air cushion, without physical contact between the moving parts, the construction being such that the cushioning effect is greater during the latter part of the downward swing of each of the beam ends than during the early part of such swing, the cushioning device for the opposite end of the beam being adapted to exert a cooperative cushioning effect, whereby the beam will be caused to come to rest practically without any oscillation, thus enabling the user to obtain a quick and accurate reading, and avoiding the likelihood of the user taking a reading while the pointer is oscillating very short distances apart.

A further object of the invention is to improve the construction and operation of the graduated scale which operates in conjunction with the indicator or pointer, whereby the scale will include a vernier adjustment, including a movable scale having a greater number of fractional parts in each of its divisions than in one division of the fixed scale, whereby an accurate vernier reading is quickly obtainable.

A still further object is to provide a cushioning equipment which is readily applicable to standard types of balances at present in use, by simple attachment of the cushioning means to the column or other standard or support for the balance.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings:

Fig. 2 is a transverse sectional view through the apparatus as shown in Fig. 1, taken substantially on the line 2—2 of said figure, looking in the direction of the arrows;

Fig. 3 is an enlarged detail sectional view through one of the cushioning devices, taken on the line 3—3 of Fig. 2, looking in the direction of the arrows;

Fig. 4 is a perspective view of the fixed scale;

Fig. 5 is a perspective view of the movable scale which cooperates with the fixed scale of Fig. 4, to provide the vernier adjustment; and Fig. 6 is a perspective view of one of the bracket members for supporting the cushioning means upon the column of a standard balance.

Figure 1:
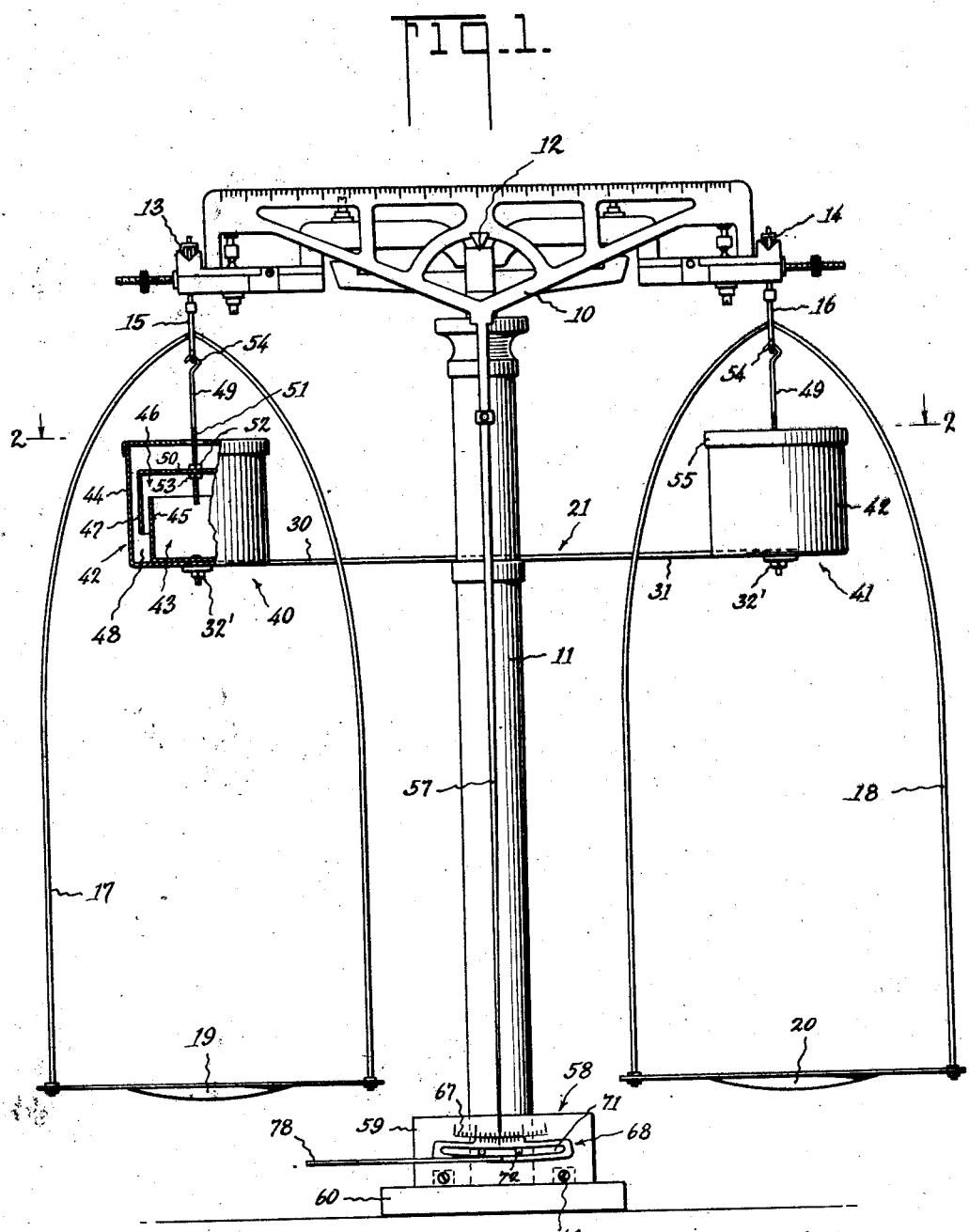
Fig. 1 is a front elevation, partly in section, of a typical analytical balance, showing the present improvements applied thereto.

The invention, in this instance, is shown in connection with a conventional type of analytical balance, which includes a swingable beam 10 supported upon a column 11 by means of a central knife edge 12, the opposite ends of the beam having knife edge supports 13 and 14 for a pair of hooked rods or joints 15 and 16, respectively, from which latter are suspended two pairs of bows 17 and 18, respectively, which pairs of bows carry the usual pans 19 and 20.

To cushion the swinging movement of the beam I provide, in this instance, a shock absorbing or oscillation damping attachment, which, in this instance, is adapted to be mounted upon the column 11 of the balance, but which may be otherwise mounted if desired. This attachment, as shown, includes a horizontal bar 21 adapted to be fixedly secured to a horizontal bracket 22, mounted on the column 11. This bracket 22 includes two similar half portions 23, each of which has a rounded portion 24 to embrace one side of the column, and an elongated rearwardly extending portion 25. The two bracket halves 23 are secured together about the column 11 by suitable rivets 26 which extend through aligned holes 27 in the meeting bracket portions 25. Each of the bracket portions 25 is provided, at its free end, with a vertical semicircular recess 28 which together produce a cylindrical aperture for reception of a screw of the like 29 by which the bar 21 is secured to the bracket 22.

The bar 21 is thus supported in the parallel plane of the beam 10, and preferably to the rear thereof, the end portions 30 and 31 of the bar terminating substantially in the vertical plane of the respective beam ends. A pair of arms 32 and 33 are mounted horizontally on the beam ends 30 and 31, respectively, and means are provided so that the forward ends of the arms 32 and 33 may be positioned substantially in the axial planes of the respective beam ends. For this latter purpose the arms 30 and 31 are preferably provided with elongated slotted portions 34 and 35, respectively, and the arms 32 and 33 have similar slotted portions 36 and 37, respectively. Thumb screws or similar fastening devices 38 and 39, respectively, are passed through the slots 34, 36 and 35, 37, to secure the arms 32 and 33 in the proper adjusted position upon the bar.

The cushioning means proper include, in this instance, a pair of cushioning devices 40 and 41, one for each end of the beam. Both of these cushioning devices are alike in construction, so that a description of one will suffice for the other. As seen in detail in Figs. 1 and 3, each cushioning device includes a pair of concentric open top cups, including an outer cup 42 and an inner cup 43, the outer cup 42 being of greater height than the inner cup 43, there being a small clearance between the walls 44 and 45 of the respective cups. The cups 42 and 43 are secured to the end of the arm 32 (or 33, as the case may be) by means of a suitable rivet or other fastening means 32'. The cups 42 and 43 are thus rigidly mounted in stationary relation to the swingable beam.

A third cup 46 is inverted over the inner cup 43, the lower or open portion of the cup 46 being adapted to surround the wall 45 of the inner cup 43, the inverted cup 46 being suitably mounted to be carried by the beam so that the side wall 47 of the cup 46 will traverse the annular space 48 between the walls 44 and 45 of the stationary cups 42 and 43. The wall 47 of the cup 46 is desirably of about the same height as the wall 45 of the cup 43, but less than the height of the wall 44 of the outer cup 42. To movably support the cup 46 a supporting rod 49 is preferably secured to the bottom portion 50 of the inverted cup 46, the lower part of the rod 49 being preferably provided with screw threads 51 and being adapted to be secured in different adjusted position by means of suitable lock nuts or the like indicated at 52 and 53. The upper end of the supporting rod 49 is equipped with a hook portion 54 by which the respective cushioning devices 40 and 41 are secured to the hooked rods 15 and 16 which are suspended from the opposite beam ends. The outer cup 42 is preferably provided with a removable cover 55, and this cover is provided with an axial aperture 56 through which the rod 49 extends. The aperture 56 is preferably of such size that substantial clearance will be afforded for the rod 49, so that there will be no physical contact between any of the relatively movable parts of the cushioning devices during swinging of the beam, and also so that air may be admitted and exhausted through the aperture 56.

During swinging of the beam in a downward direction, the air trapped between the inner cup 43 and the inverted cup 46 will act as a sensitive air cushion, while, at the opposite or upwardly swinging end of the beam a reverse cushioning effect will occur between the inverted cup and the stationary cups as air is permitted to exhaust from the interior of the cup 43, through the annular passage 48, and out through the axial aperture 56. Since the oscillations of the beam are of very slight strength, due to the sensitiveness of the balance, the air cushioning effect obtained is also very slight, yet sufficient to restrain the oscillation of the beam ends practically instantaneously, so that the indicator pointer 57, and, as well, any other indicating devices carried by the balance, will come to rest practically instantaneously.

I also provide, in this instance, improved means for obtaining a vernier adjustment of the scale with which the indicator pointer 57 cooperates, whereby to obtain a very accurate reading.

The stationary scale 58 includes, in this instance, a plate 59 suitably secured to the base portion 60 of the column, as for instance by means of screws 61 which extend through apertures 62 provided in the scale plate 59, and into the base portion 60. This stationary scale plate 59 is provided with arcuately arranged graduations laid out in a plurality of divisions 63, 64, 65 and 66, any desired number of divisions being provided. Each of the divisions is of equal length and includes the same number of fractional parts or subdivisions 67, having any specified value, such, for instance, as one milligram.

The indicator pointer 57 may ordinarily cooperate with the graduations of the stationary scale 58, but, for fine adjustment purposes, and to secure very accurate fractional readings, I provide, in this instance, a movable scale 68 to cooperate with the stationary scale 58. This movable scale 68 includes an elongated arcuately formed body or base portion 69 and an upstanding graduated portion 70. The base portion 69 has an elongated slot 71, and the stationary scale 58 is provided with a pair of pins or similar devices 72 which extend through the slot 71, to movably support the scale 68 upon the scale plate 59, the outer ends of the pins 72 being preferably upset, or headed, or being otherwise equipped to retain the movable scale 68 in place.

The upstanding portion 70 of the movable scale is provided with graduations, in this instance laid out in two divisions 73 and 74, of equal length. Each of the divisions 73 and 74 is provided with a like number of fractional parts or subdivisions 75, having suitable indicia 76 reading from the zero point 77 between the divisions 73 and 74. In this instance the fractional parts or subdivisions of the movable scale divisions are provided to a number greater than the fractional parts of the stationary scale divisions, which fractional parts of the stationary scale divisions have the same length as the fractional parts of the movable scale divisions. That is to say, in this instance, five fractional subdivisions of the movable scale are equal in length to four fractional parts or subdivisions of one of the stationary scale divisions.

Means are provided to move the movable scale to a position so that its zero point 77 will coincide with the rest position of the pointer or indicator 56 on the stationary scale plate 59. In this instance the base portion 69 of the movable scale is equipped with an elongated rod 78 which may extend outward to a side of the casing or other enclosure for the balance, the outer end of the rod preferably being provided with an operating knob.

To obtain a very fine and accurate reading, the indicator pointer 57 is allowed to come to rest along the stationary scale, and the rod 78 is then operated so that the zero point 77 will coincide with the rest position of the pointer. The fractional indicia 76 of the movable scale will thus lie between the fractional subdivisions of the stationary scale, and will indicate fractional parts of each of the stationary scale fractional subdivisions, in accordance with standard vernier practice, thus enabling the user to obtain a very rapid and accurate scale reading.

Considerable particularities of description, as to materials, part details, dimensions, capacities and utilities may have been herein indulged in, but it will be understood that these statements, made with particular reference to the embodiments of the invention illustrated in the drawings, are not in any way to be taken as definitive or limitative of the invention. Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

What I claim is:

1. The combination with an indicating balance having a swingable beam and a supporting column therefor, of an air cushioning attachment for damping the oscillations of said beam, said air cushioning attachment including a pair of devices each including a pair of open top concentric cylindrical stationary cups, means to rigidly support said pair of stationary cups beneath opposite ends of said beam, a movable inverted cup member concentric with each pair of said open top cups, the wall of said inverted cup traversing the annular space between the walls of said open top cups, means to support said inverted cups at opposite ends of said beam, the outermost open-top cup having a removable closure, said closure having an axial hole for passage of said rod and for air intake and exhaust, and means for adjusting the travel of said inverted cup.

2. The combination with an indicating balance having a swingable beam and a supporting column therefor, of an air cushioning attachment for damping the oscillations of said beam, said air cushioning attachment including a pair of devices each including a pair of open top concentric cylindrical stationary cups, means to rigidly support said pairs of stationary cups upon said column, a movable inverted cup member concentric with each pair of said open top cups, the wall of said inverted cup traversing the annular space between the walls of said open top cups, a rod axially secured to said inverted cup, each end of said beam having a suspension member, each of said rods having a hook portion for attachment to one of said suspension members, the outermost open-top cup having a removable closure, said closure having an axial hole for passage of said rod and for air intake and exhaust, said rod including a screw threaded portion affording means for adjusting the travel of said inverted cup.

3. The combination with an indicating balance having a swingable beam and a supporting column therefor, of an air cushioning attachment for damping the oscillations of said beam, said air cushioning attachment including a pair of devices each including a pair of open top concentric cylindrical stationary cups, an arm to which said pair of cups are secured, an elongated bar adjustably connected at each of its opposite ends to one of said arms, a bracket secured to said bar, said bracket including a pair of column engaging members, a movable inverted cup member concentric with each pair of said open top cups, the wall of said inverted cup traversing the annular space between the walls of said open top cups, means to support said inverted cups at opposite ends of said beam the outermost open-top cup having a removable closure, said closure having an axial hole for passage of said rod and for air intake and exhaust.

4. The combination with an indicating balance having a swingable beam and a supporting column therefor, of an air cushioning attachment for damping the oscillations of said beam, said air cushioning attachment including a pair of devices each including a pair of open top concentric cylindrical stationary cups, an arm to which said pair of cups are secured, an elongated bar adjustably connected at each of its opposite ends to one of said arms, a bracket secured to said bar, said bracket including a pair of column engaging members, a movable inverted cup member concentric with each pair of said open top cups, the wall of said inverted cup traversing the annular space between the walls of said open top cups, a rod axially secured to said inverted cup, each end of said beam having a suspension member, each of said rods having a hook portion for attachment to one of said suspension members.

5. The combination with an indicating balance having a swingable beam and a supporting column therefor, of an air cushioning attachment for damping the oscillations of said beam, said air cushioning attachment including a pair of devices each including a pair of open top concentric cylindrical stationary cups, an arm to which said pair of cups are secured, an elongated bar adjustably connected at each of its opposite ends to one of said arms, a bracket secured to said bar, said bracket including a pair of column engaging members, a movable inverted cup member concentric with each pair of said open top cups, the wall of said inverted cup traversing the annular space between the walls of said open top cups, a rod axially secured to said inverted cup, each end of said beam having a suspension member, each of said rods having a hook portion for attachment to one of said suspension members, the outermost open-top cup having a removable closure, said closure having an axial hole for passage of said rod and for air intake and exhaust, said rod including a screw threaded portion affording means for adjusting the travel of said inverted cup.

6. The combination with a balance and the like having a swingable beam and an indicating pointer, of an indicating scale including a stationary graduated scale associated with said indicating pointer, a movable scale associated with said stationary scale, both of said scales having divisions of equal length, each division of said movable scale having a different number of fractional parts when the fractional parts of each division of the stationary scale, said stationary scale including means to slidably support said movable scale, and an operating rod pivotally secured to said movable scale for manipulation of said movable scale to different positions whereby the zero point of said movable scale coincides with the rest point of said indicator pointer on said stationary scale, to indicate fractional parts of one of the equal fractional parts of one of the stationary scale divisions.

7. The combination with a balance and the like having a swingable means and an indicating pointer, of an indicating scale including a stationary graduated scale associated with said indicating pointer, a movable scale associated with said stationary scale, both of said scales having divisions of equal length, each division of said movable scale having a greater number of fractional parts than the fractional parts of each division of the stationary scale, said movable scale having an elongated slot, said stationary scale including a plate having a plurality of devices traversing said slot and securing the stationary and movable scales together in operative relationship, and an operating rod pivotally secured to said movable scale for manipulation of said movable scale to different positions whereby the zero point of said movable scale coincides with the rest point of said indicator pointer on said stationary scale, to indicate fractional parts of one of the equal fractional parts of one of the stationary scale divisions.

8. The combination with a balance and the like having a swingable beam and an indicating pointer, of an indicating scale including a stationary graduated scale associated with said indicating pointer, the graduations of said stationary scale being arcuately arranged, a movable scale associated with said stationary scale, both of said scales having divisions of equal length, each division of said movable scale having a different number of fractional parts than the fractional parts of each division of the stationary scale, said movable scale including an elongated base having an elongated slot, said stationary scale including means traversing said elongated slot and securing the stationary and movable scales together in operative relationship, and an operating rod pivotally secured to the base portion of said movable scale for manipulation of said movable scale to different positions whereby the zero point of said movable scale coincides with the rest point of said indicator pointer on said stationary scale, to indicate fractional parts of one of the equal fractional parts of one of the stationary scale divisions.

9. The combination with a balance and the like having a swingable beam and an indicating pointer, of an indicating scale including a stationary graduated scale associated with said indicating pointer, the graduations of said stationary scale being arcuately arranged, a movable scale associated with said stationary scale, both of said scales having divisions of equal length, each division of said movable scale having a greater number of fractional parts than the fractional parts of each division of the stationary scale, said movable scale including an elongated base having an elongated slot, said stationary scale including a plate having a plurality of pins traversing said elongated slot and securing the stationary and movable scales together in operative relationship, and an operating rod pivotally secured to the base portion of said movable scale for manipulation of said movable scale to different positions whereby the zero point of said movable scale coincides with the rest point of said indicator pointer on said stationary scale, to indicate fractional parts of one of the equal fractional parts of one of the stationary scale divisions.

In testimony whereof I hereby affix my signature.

JOHN F. KRAYER.